| United States Patent [19] | [11] Patent Number: 4,811,549 |
| Usami et al. | [45] Date of Patent: Mar. 14, 1989 |

[54] METHOD FOR CONTAINING TWO-PART COMPOSITION

[75] Inventors: Ikuzo Usami, Negoya; Yoshinori Sato, Sagamihara; Yoshitaka Kurosawa; Kazuyuki Morimura, both of Hachioji, all of Japan

[73] Assignee: Three Bond Co., Ltd., Tokyo, Japan

[21] Appl. No.: 36,238

[22] Filed: Apr. 9, 1987

[30] Foreign Application Priority Data

Apr. 15, 1986 [JP] Japan .................................. 61-86857
Mar. 2, 1987 [JP] Japan ............................. 62-30300[U]
Mar. 11, 1987 [JP] Japan ............................ 62-35373[U]

[51] Int. Cl.⁴ ........................................... B65B 29/10
[52] U.S. Cl. ...................................... 53/428; 53/474; 252/315.4
[58] Field of Search .................. 53/428, 431, 474; 252/315.1, 315.4

[56] References Cited

U.S. PATENT DOCUMENTS

| 3,462,008 | 8/1969 | Tibbs ............................. 53/474 X |
| 3,969,087 | 7/1976 | Saito et al. ................... 252/316 X |
| 4,502,975 | 3/1985 | Kobayashi et al. ......... 252/315.1 |
| 4,680,916 | 7/1987 | Ginn .............................. 53/474 X |

*Primary Examiner*—James F. Coan
*Assistant Examiner*—Steven P. Weihrouch
*Attorney, Agent, or Firm*—Martin A. Farber

[57] ABSTRACT

A container is disclosed herein for containing a two part composition consisting of two components in a container with said components isolated in such a manner that they are not mixed with each other. The two components are preserved in an isolated relation to each other prior to use, and if intended to be used, they are mixed together and then placed into service. At least one of said components is jellied by addition of a viscosity modifier thereinto.

7 Claims, 3 Drawing Sheets

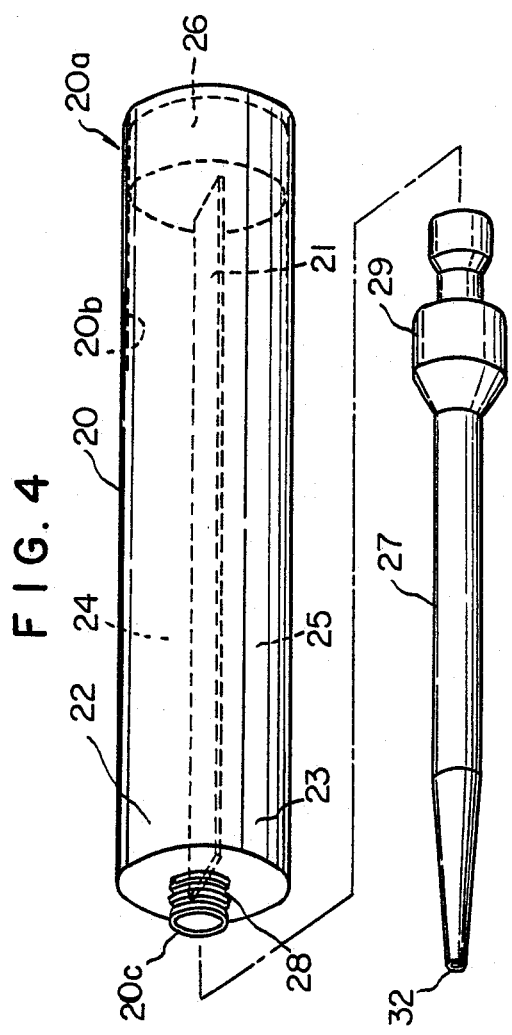
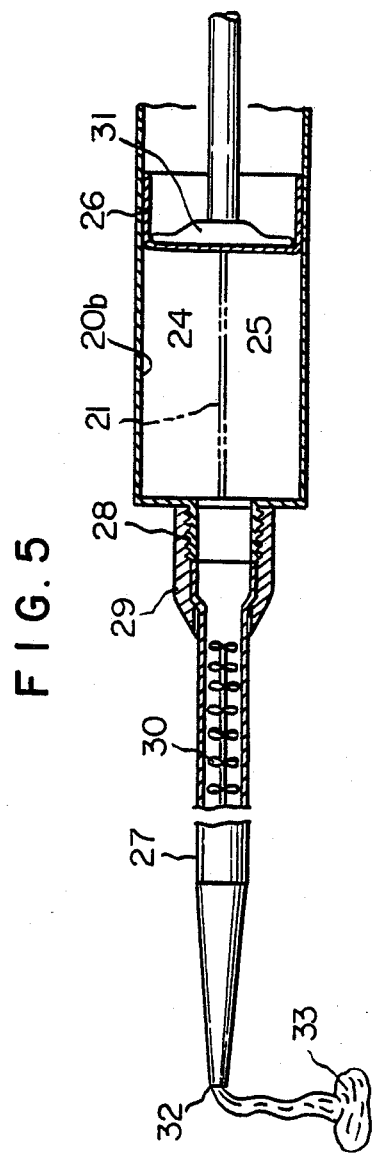

METHOD FOR CONTAINING TWO-PART COMPOSITION

BACKGROUND OF THE INVENTION

1. FIELD OF THE INVENTION

The present invention relates to a method for containing a two part composition consisting of two components in a container with two components isolated in such a manner that they are not mixed with each other, the two components being preserved in an isolated relation to each other prior to use, and if intended to be used, the components being mixed together and then placed into service, and particularly, to a method for containing a two part composition consisting of two components which are easy to isolate and can be easily mixed as desired to be used.

2. DESCRIPTION OF THE PRIOR ART

Adhesives, sealants, coatings, casting materials, etc., are principally placed into service by mixing a primary component such as epoxy, unsaturated polyester, vinyl ester, polyurethane, silicone and polymercapto resins with a curing agent (catalyst) as a secondary component and then causing a curing phenomenon in the resulting mixture to occur by a chemical reaction and curing it. Such two part compositions are preserved with individual components separately isolated prior to use and when the two part composition is to be used, these components are mixed and placed into service. Such two part compositions should be preserved with individual components separately isolated in such a manner that they are not mixed with each other.

It is conventionally known to use a container as shown in FIG. 2 in containing such a type of two part compositions. As apparent from FIG. 2(a), the container 1 is constructed with its interior divided into a space 3 and spaces 4 by isolating walls 2. For example, a primary component such as an epoxy resin is filled into the space 3, and a curing agent is filled into the spaces 4. Then, a cover layer 5 is mounted on the top of the container by heat sealing. In this way, the primary component and the curing agent are contained in the container in a separately isolated relation. When such two part composition is intended to be used, the cover layer 5 is stripped and then, the section of the space 3 is depressed down to deform the container 1 as shown in FIG. 2(b) to mix the primary component with the curing agent.

With this type of container, however, various disadvantages are countered: It is not easy to depress down the section of the space 3 and in addition, in view of materials, a special flexible material must be selected. Moreover, only a relatively small volume of components may be filled.

Alternatively, a method has been adopted for containing and preserving two components in separate containers, wherein when these components are desired to be used, they are mixed. With this method, however, there is required an operation for transferring the contained components when they are to be mixed, resulting in a longer time. Additionally, it is feared that the liquid remaining causes a failure of curing or the like.

OBJECT OF THE INVENTION

It is therefore an object of the present invention to provide a method for containing a two part composition, wherein two individual components are easy to isolate and can be readily mixed when intended to be used, and wherein the disadvantages found in the above known prior art are overcome.

SUMMARY OF THE INVENTION

According to the present invention, the above object is accomplished by providing a method for containing a two part composition consisting of two components in a container with the components isolated in such a manner that they are not mixed with each other, the two components being preserved in an isolated relation to each other prior to use, and if intended to be used, the components being mixed together and then placed into service, wherein at least one of the two components are jellied by addition of a viscosity modifier.

With the above method, the two part composition is contained in the container with one of the two components jellied by addition of a viscosity modifier and therefore, the two individual components are easy to isolate in the container and can be readily mixed when intended to be used.

The above and other objects, features and advantages of the invention will become apparent from reading of the following detailed description taken in conjunction with the accompanying drawings.

BRIEF DESCRIPTION OF THE DRAWINGS

FIG. 4 is a perspective view of another embodiment of a container for use in the present invention;

FIG. 5 is a partially sectional view illustrating the container of FIG. 4 as being in use;

DETAILED DESCRIPTION OF THE INVENTION

The above-descirbed two part compositions, which are preserved with the individual components isolated prior to use and when intended to be used, are placed into service with such individual components mixed with each other, consist of two components, for example, a primary component such as an adhesive, a sealant, a coating and a casting material and a curing agent as a secondary component. Illustrative of the primary components are epoxy, unsaturated polyester, acrylic, silicone, polyurethane, polymercapto resins, etc.

Figure 1:
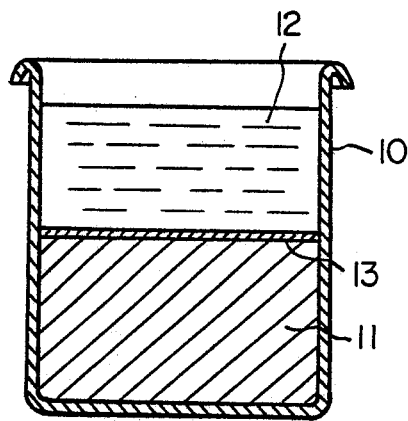
FIG. 1 is a sectional view of a two part composition contained in a container by a containing method; the present invention.
Figure 2A:
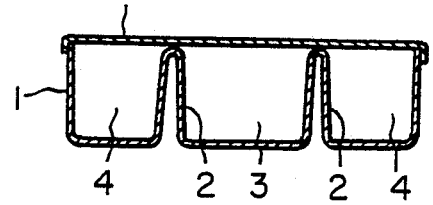
FIGS. 2(a) and 2(b) are sectional views illustrating the prior art method for containing a two part composition in the known container, FIG. 2(a) illustrating two components isolated and FIG. 2(b) illustrating the components mixed.

The two part composition is usually in the form of a liquid, but may be in the form of a powder or the like. The viscosity modifier may be added to at least one or both of the two components. When one component has been jellied, the jellied component 11 is disposed below the liquid component 12 within a container 10, as shown in FIG. 1.

It is tobe noted that an isolating or barrier membrane can be interposed at a boundary between the jellied component and the other adjacent component to provide a further completely prevention of these components from being mixed. Such barrier membranes which may be used include inert thin membranes such as polyethylene films, aluminum foils or the like.

Figure 3:
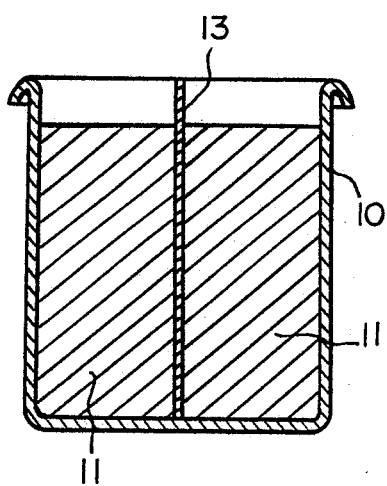
FIG. 3 is a sectional view of two components otherwise contained according to the present invention.
Figure 2B:
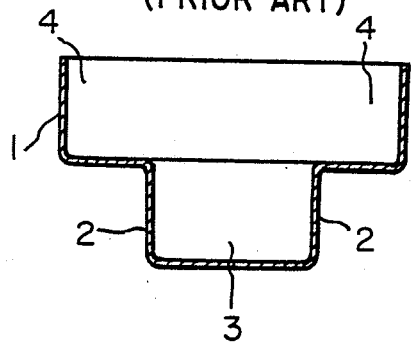

In addition, the container 10 used in the present invention may be a container 10 having an isolating membrane 13 vertically disposed therein, as shown in FIG. 3. In this case, both of left and right hand substances 11 and 11 are preferably those jellied.

The viscosity modifiers which may be used include those commercially available, and specific examples of them are benzylidenesorbitol, lauroylglutamic dibutylamide, organobentonites, asbestos powders, silica powders, hydrogenated caster oils, etc. The amount of viscosity modifier added may be of any level depending upon the type of components and viscosities, but should be in a range sufficient to provide a viscosity, i.e., a jellied condition sufficient so that the viscosity modifier cannot be mixed with the other liquid component.

EXAMPLES

The present invention will now be described in more detail by way of Examples.

EXAMPLE 1

Samples (Nos. 1 to 7) of various epoxy resins were used and tested for their preservability and mixability as well as adhesion propertie. The results are given in Table 1.

For each sample, a viscosity modifier was added to a curing agent (liquid B) in any case and stirred at 110° C. for about 30 minutes. Immediately after this stirring, the mixture was placed into a container. The container used was a plastic can in any case.

Sample No. 1:
Primary component: Epicoat #828 828 (bis-phenol type epoxy resin available from Oil Shell K.K.)
Curing agent (liquid B): TB2106B (modified alicylic polyamide available from Three Bond Co., Ltd.)
Viscosity modifier: Coregulane Gp-1 (lauroylglutamic dibutylamide available from Ajimomoto K.K.)
Amount added: TB2106B/Coregulane Gp-1=100/5 (parts by weight)
Barrier membrane: Nitto tape (polyethylene film of 85μ available from Nitto Electro Chemicals Co.)
Sample No. 2:
Primary component: similar to sample No. 1
Curing agent: TB2105C (modified polyamideamine available from Three Bond Co., Ltd.)
Viscosity modifier: similar to sample No. 1
Amount added: TB2105C/Coregulane Gp-1=100/5
Barrier membrane: similar to sample No. 1
Sample No. 3:
Primary component: similar to sample No. 1
Curing agent: similar to sample No. 1
Viscosity modifier: similar to sample No. 1
Amount added: similar to sample No. 1
Barrier membrane: Toyo aluminum foil of 15μ (available from Toyo Aluminum Foil Products K.K.)
Sample No. 4:
Primary component: similar to sample No. 1
Curing agent: similar to sample No. 2
Viscosity modifier: similar to sample No. 1
Amount added: similar to sample No. 2
Barrier membrane: similar to sample No. 3
Sample No. 5:
Primary component: similar to sample No. 1
Curing agent: similar to sample No. 1
Viscosity modifier: similar to sample No. 1
Amount added: similar to sample No. 1
Barrier membrane: not utilized
Sample No. 6:
Primary component: similar to sample No. 1
Curing agent: Sanmide #335 (modified polyamideamine available from Sanwa Chemical industries Co., Ltd.)
Viscosity modifier: Coregulane GP-1 and silica sol powder
Amount added: Sanmide #335/Coregulane GP-1 and silica sol powder=100/5/10
Barrier membrane: not utilized
Sample No. 7:
Primary component: similar to sample No. 1
Curing dagent: similar to sample No. 2
Viscosity modifier: similar to sample No. 1
Amount added: similar to sample No. 2
Barrier membrane: not utilized

TABLE 1

| Sample No. | Results of Preservation Test days | | | Results of Mixing Test | Adhesive Force (kg/cm$^2$) |
| --- | --- | --- | --- | --- | --- |
| | 1 | 10 | 30 | | |
| 1 | ⊚ | ⊚ | ○ | good | 220 |
| 2 | ⊚ | ⊚ | ○ | good | 220 |
| 3 | ⊚ | ⊚ | ○ | good | 220 |
| 4 | ⊚ | ⊚ | ○ | good | 220 |
| 5 | ⊚ | ○ | △ | good | 210 |
| 6 | ⊚ | ○ | △ | good | 140 |
| 7 | ⊚ | ○ | △ | good | 210 |

⊚—Little reaction occured
○—A reaction observed at a portion of the interface
△—The interface cured into a thin film The mixing test was conducted by manually stirring with a glass stirring rod for the samples which had been preserved for a month.

The test for adhesive force was conducted by determining tensil shearing strengths (kg/cm$^2$) according to JIS k 6850 (1976) procedure "Method For Testing Tensil Shearing Strength of Adhesive". The testing pieces used were Fe/Fe.

As apparent from Table 1, any of the sample Nos. 1 to 7 were good for preservability and mixability and adhesive force. With the sample Nos. 5 to 7, there were particulates present in the mixture due to the thin film-like cured product, but there was not observed any influence on the adhesive force.

EXAMPLE 2

The following Sample Nos. 8 to 12 of various epoxy resins were used as two part compositions and tested for their preservability, mixability and adhesive force in the same manner as in Example 1. The results are given in Table 2.

For the individual samples, a viscosity modifier was added into a primary component (liquid A) in any case. The resulting mixture was stirred at 120° C. for 30 minutes and immediately placed into a container. The container used was a metallic can in any case.

Sample No. 8:
Curing agent: TB2105B (modified polyamideamine available from Three Bond Co., Ltd.)
Viscosity modifier: Chemibest FD-SS5 (high density polyethylene available from Mitusi Petroleum chemical Industries Co.)

Amount added: Epicoat #828Chemibest FD-SS5=100/6 (parts by weight)
Barrier membrane: Nitto tape (similar to Sample No. 1)

Sample No. 9:
Primary component: TB2002 (bisphenol A type epoxy resin available from Three Bond Co., Ltd.)
Curing agent: similar to Sample No. 8
Viscosity modifier: Hydrogenated caster oil
Amount added: TB2002/hydrogenated caster oil=30:1
Barrier membrane: Nitto tape (similar to Sample No. 1)

Sample No. 10:
Primary component: TB2002 (similar to Sample No. 9)
Curing agent: similar to Sample No. 8
Viscosity modifier: Gelol D (benzilidenesorbitol available from Shin Nippon Rika K.K.)
Amount added: TB2002/Gelol D=100:5
Barrier membrane: Nitto tape (similar to Sample No. 1)

Sample No. 11:
Primary component: TB2003 (bisphenol A type epoxy resin available from Three Bond Co. Ltd.)
Curing agent: Sanmide #335 (similar to Sample No. 6)
Viscosity modifier: Gelol D (similar to Sample No. 10)
Amount added: TB2003/Gelol D=100:2.5
Barrier membrane: not utilized Sample No. 12:
Parimary component: TB2003 (similar to Sample No. 11)
Curing agent: TB2105C (modified polyamideamine available from Three Bond Co., Ltd.)
Viscosity modifier: Coregulane GP-1 (similar to Sample No. 1)
Amount added: TB2003/Coregulane GP-1=100/3
Barrier membrane: not utilized

TABLE 1

| Sample No. | Results of Preservation Test days | | | Results of Mixing Test | Adhesive Force (kg/cm²) |
| --- | --- | --- | --- | --- | --- |
| | 1 | 10 | 30 | | |
| 8 | ⊚ | ⊚ | ⊚ | good | 200 |
| 9 | ⊚ | ⊚ | ○ | good | 190 |
| 10 | ⊚ | ⊚ | ⊚ | good | 200 |
| 11 | ⊚ | ○ | ○ | good | 130 |
| 12 | ⊚ | ○ | ○ | good | 200 |

⊚—Little reaction occured
○—A reaction observed at a portion of the interface

It can be seen from Table 2 that any of Sample Nos. 8 to 12 are excellent in preservability and mixability as well as adhesive force.

EXAMPLE 3

The following Samples Nos. 13 and 14 of epoxy resins were used as two part compositions and tested for their preservability, mixability and adhesive force in the same manner as in Example 1. The results are given in Table 3.

For the individual samples, a viscosity modifier was added into both of a primary component (liquid A) and a curing agent (liquid B) in any case. The resulting mixture was stirred at 120° C. for 30 minutes and immediately placed into a container. The container used was a plastic can in any case.

Sample No. 13:
Primary component: TB2003 (similar to Sample No. 11)
Curing agent: Sanmide #335 (similar to Sample 6)
Viscosity modifier: Gelol D (similar to Sample No. 10), Coregulane GP-1 (similar to Sample No. 1) and silica gel powder
Amount added: TB2003/Gelol D=100: 2.5 (stirred at 120° C. for 30 minutes), and Sanmide #335/Coregulane GP-1/silica gel powder=100/5/10 (stirred at 110° c. for 30 minutes)

Sample No. 14:
Primary component: TB2003 (similar to Sample No. 11)
Curing agent: TB2105C (similar to Sample No. 12)
Viscosity modifier: Coregulane GP-1 (similar to Sample No. 1)
Amoung added: TB2003/Coregulane GP-1=100/3 (stirred at 120° C. for 30 minutes) and TB2105C/Coregulane GP-1=100/5 (stirred at 110° C. for 30 minutes)
Barrier membrane: not utilized

TABLE 1

| Sample No. | Results of Preservation Test days | | | Results of Mixing Test | Adhesive Force (kg/cm²) |
| --- | --- | --- | --- | --- | --- |
| | 1 | 10 | 30 | | |
| 13 | ⊚ | ⊚ | ⊚ | good | 150 |
| 14 | ⊚ | ⊚ | ⊚ | good | 220 |

⊚—Little reaction occured

It can be seen from Table 2 that any of Sample Nos. 13 and 14 are excellent in preservability and mixability as well as adhesive force.

EXAMPLE 4

The following Sample Nos. 15 to 19 were prepared as two part compositions. Among these Samples, Sample Nos. 15, 16 and 17 were determined for hardness of cured products in addition to preservability and mixability to confirm whether a normal reaction occurred or not, and Sample Nos. 18 and 19 were tested for preservability, mixability and adhesive force in the same manner as in Example 1. The results are given in Table 4.

Sample No. 15:
Primary component: Quinenate 555V (A) (urethane-based resin available from Nippon Zeon Co., Ltd.)
Curing agent: Quinenate 555V (B) (urethane-based resin available from Nippon Zeon Co., Ltd.)
Viscosity modifier: Resingrade astestos (asbestos powder available from Kalidoria Co., Ltd.)
Amount added: Quinenate 555V (A)/Resingrade astestos=100/7 (stirred at 60° C. for 30 minutes)
Barrier membrane: Nitto tape (similar to Sample No. 1)

Sample No. 16:
Primary component: KE-1204 (A) (addition reactive silicone resin available from Shinetus Chemical Industries Co.)
Curing agent: KE1204 (B) (addition-reactive silicone resin available from Sinetus Chemical Industries Co.)
Viscosity modifier: Eroziel #200 (fine silica powder available from Nippon Aerozil Co.)

Amount added: KE1204 (A)/Eroziel #200=100/2 (stirred at 60° C. for 30 minutes)
Barrier membrane: not utilized
Sample No. 17:
Primary component: similar to Sample 16
Curing agent: similar to Sample 16
Viscosity modifier: similar to Sample 16
Amount added: similar to Sample 16
Barrier membrane: Nitto tape (similar to Sample No. 1)
Sample No. 18:
Primary component: Methylmethacrylate (MMA available from Kyoeisha Fatty Oil Co., Ltd.)
Curing agent: BPE-4-(2,2-bis(4methacryloxyl diethoxyl phenyl)propane (available from Shin Nakamura Chemicals Co. Ltd.)/BPO (benzoil peroxide)=40/1
Viscosity modifier: Talc and Olubene M (organic composite of hydrated aluminum silicate available from Shiraishi Kogyo K.K.)
Amount added: MMA/talc/Olubene M=100/20/3 (stirred at 60° C. for 30 minutes)
Barrier membrane: not utilized
Sample No. 19:
Primary component: similar to Sample No. 18
Curing agent: similar to Sample No. 18
Viscosity modifier: similar to Sample No. 18
Amount added: similar to Sample No. 18
Barrier membrane: Nitto tape (similar to Sample No. 1)

TABLE 4

| Sample No. | Results of Preservation Test days (at 25° C.) | | | Results of Mixing Test | Shore Hardness |
|---|---|---|---|---|---|
| | 1 | 10 | 30 | | |
| 15 | ⊚ | ⊚ | ○ | good | D 80 |
| 16 | ⊚ | ○ | △ | good | A 75 |
| 17 | ⊚ | ⊚ | ○ | good | A 75 |
| | | | | | Adhesive Force (kg/cm$^2$) |
| 18 | ○ | ○ | △ | good | 95 |
| 19 | ⊚ | ○ | ○ | good | 100 |

The shore hardness test was carried out by determining Shore hardnesses according to JIS K 6301 procedure "Spring Hardness Test" by use of a Shore hardness tester.

It can be seen from Table 4 that any of Sample Nos. 15 to 17 are excellent in preservability, mixability and Shore hardness, and Sample Nos. 18 and 19 are excellent in preservability, mixability and adhesive force.

EXAMPLE 5

A two part composition which was used comprised a primary component (liquid A) (Epicoat #828, bisphenol type epoxy resin available from Yuka shell Co., Ltd.) and a curing agent (modified alicyclic polyamide available from Three Bond Co., Ltd.), with a viscosity modifier of Coregulane GP (laurylglutamic dibutylamide available from Ajinomoto Co., Ltd.) being added to each of the primary component and the curing agent in an amount of 5 parts by weight per 100 parts by weight thereof to jelly them.

The above two part composition was contained in a container shown in FIG. 4. FIG. 4 is a perspective view of another embodiment of a container for use in the present invention, and FIG. 5 is a partially sectional view illustrating the container of FIG. 4 as being in use, wherein the reference numeral 20 designates a container body. An isolating membrane 21 is longitudinally disposed within the container body 20, so that spaces 22 and 23 are defined within the container body 20 by the isolating membrane 21. The jellied components of the two part composition are contained respectively in the spaces 22 and 23 in such a state that they are isolated by the isolating membrane 21. The arrangement of the isolating membrane is optional.

The reference numeral 26 is a urging lid which is fitted in a bottom 20a of the container body 20 for sliding movement along an inner wall 20b of the container wall 20.

The reference numeral 27 is a mixing nozzle which is disposed at a leading end 20c of the container body 20. This disposition is provided, for example, by threadedly connecting a cap nut 29 to a screw 28 at the leading end 20c, as shown in FIG. 5. Blades 30 are fitted in the mixing nozzle 27, for example, as shown in FIG. 5, so that the two components are passed through the blades and mixed.

The filling of the two components into the container body 20 was conducted in the following manner: First, the viscosity modifier was added to the primary component as well as the curing agent at a temperature of 110° to 120° C. and melted. While being hot and fluid, at first, the curing agent was filled into the container body 20 until it occupied half of the container, and it was cooled and then jellyed (component 25). Then, Nitto tape (polyethylene film of 85μ available from Noitto electrochemical industries co., Ltd.) was placed onto the jellied component and thereafter, the primary component was introduced into the container, cooled and solidified.

The resulting container was found to be easy and complete to isolate the two components and also easy to mix the two components in use. More specifically, as shown in FIG. 4, the two components 24 and 25 are separately preserved without being mixed in the container body and particularly with the isolating membrane 21 used, they are completely preserved, because they have been jellied prior to use. When the two components are intended to used, the isolating membrane 21 is withdrawn from the container body 20 and then, the two components are extruded into the mixing nozzle 17 by causing an urging piece 31 of an urging gun (not shown) to press and slide the urging lid 26 on the inner wall 20b. The two components 24 and 25 are mixed in the mixing nozzle 17 while being passed through the blades 30, and then taken out of the nozzle leading end 32 as a mixture which is then placed into service.

Therefore, with the above container, the two components are not only isolated by the isolating membrane 21 during preservation, but also cannot react to cure, because the two compponents themselves have been jellied. In use, the two components 24 and 25 are mixed together upon being pushed by the urging lid 26 after removal of the isolating membrane 21 and then placed into service. Accordingly, the above container is easy and complete to isolate the two components and also easy to mix them in use.

EXAMPLE 6

The two part composition used was one described in Example 5.

Figure 6:
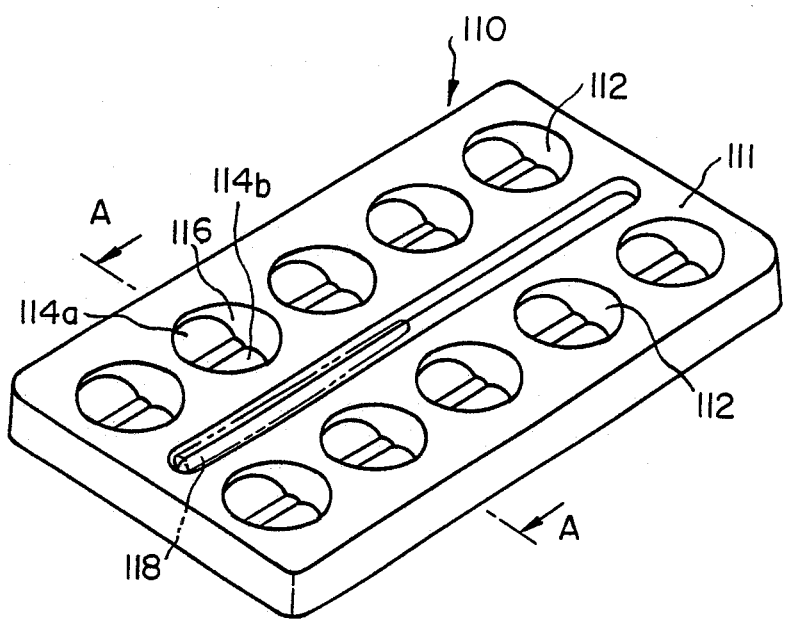
FIG. 6 is a further embodiment of a container for use in the present invention.
Figure 7:
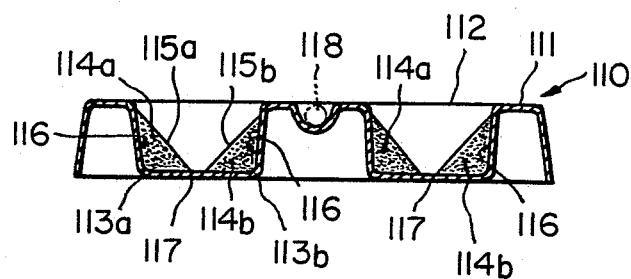
FIG. 7 is a sectional view taken along a line A—A of FIG. 1.

The above two part composition was contained in a container shown in FIG. 6. FIG. 6 is a perspective view of a further embodiment of a container for use in the present invention, and FIG. 7 is a sectional view taken along a line A—A of FIG. 6, wherein the reference numeral 110 designates a plate-like container for use in the present invention. A plurality of depressions 112 are provided in a surface 111 of the container 110. The depression 112 is defined as being cylindrically fallen down from the surface 111, as shown in FIG. 6, but the shape thereof is optional. Jellied components 114a and 114b of the two part composition are contained in the opposite corners 113a and 113b of the depression 112 in a spaced apart relation to each other, with the respective surfaces 115a and 115b of the components 114a and 114b inclined from an inner rising surface 116 of the depression 112 to a bottom surface 117, as shown in FIG. 7.

The filling of the two components into the plate-like container 110 was conducted in the following manner: First, the viscosity midifier was added to the primary component as well as the curing agent at a temperature of 110° to 120° C. and melted. While being hot and fluid, at first, the curing agent is allowed to obliquely flow int the corner 113a of the depression 112 shown in FIG. 6 and then, it is cooled and jellied (component 114a). Then, the primary is likewise allowed to flow into the corner 113b of the depression 112 and then, it is cooled and solidified.

The resulting container was found to be easy and complete to isolate the two components and also easy to mix them in use. More specifically, as shown in FIG. 6, the two components are contained in the corners 113a and 113b of the depression 112 in jellied conditions and in a spaced apart relation to each other, so that they cannot contact with each other during preservation. Particularly, since the two components 114a and 114b are contained with their surfaces 115a and 115b inclined, they are stable and free from care of destroying during preservation. Accordingly, the individual components 114a and 114b are easily and completely isolated. In use, the components 114a and 114b are mixed within the depression 112 by a stirring rod 118 and placed into service in the form of a mixture.

Thus, with the above container, the two components cannot react to cure, because they has been themselves jellied and moreover contained in the opposite corners in a spaced apart relation to each other with their surfaces inclined. In use, merely stirring the two components 114a and 114b in the depression 112 by the stirring rod 118 enables them to be mixed and used. Accordingly, the containers in accordance with the present invention are easy and complete to isolate the two components and also easy to mix them in use.

What is claimed is:

1. A method for storing and then mixing, using a cartridge container adapted to contain two jellied components of a two-part composition, comprising
a cylindrical body,
a mixing nozzle communicating with the interior of said body at one end of said body,
an urging lid adapted to be movably inserted in another end of said body, the method comprising the steps of
sliding an isolating membrane into said body separating the interior into two spaces communicating with the nozzle,
isolating the jellied components of the two-part composition contained respectively in said spaces, separately preserving the two components being without being mixed in the body by the isolating membrane,
removing the isolating membrane from the container body, and
mixing said two components by providing at least one blade in said mixing nozzle for promoting mixing of said two components while the latter pass through said nozzle by moving said urging lid into said body.

2. A method comprising the steps of
containing a two part composition consisting of two components in a container with said components isolated in such a manner that they are not mixed with each other, said two components being preserved in an isolated relation to each other prior to use, said container having an outlet nozzle, and
jelling at least one of said components by addition of a viscosity modifier thereinto, and
when intended to be used, mixing said components together in said container at latest in said outlet nozzle during exiting of the components from the container and then placing them into service.

3. A method according to claim 2, wherein
said viscosity modifier is selected from the group consisting of benzylidenesorbitol, lauroylglutamic dibutylamide, organobentonites, asbestos powders, silica powders and hydrogenated caster oils.

4. A method according to claim 2, wherein
an isolating membrane is interposed between the jellied component and the other adjacent component prior to the mixing.

5. A method for storing and then mixing, using a cartridge container adapted to contain two jellied components of a two-part composition, the container comprising
a hollow container body,
nozzle means comprising a mixing nozzle communicatingly disposed at a leading end of the container body, the method comprising the steps of
sliding an isolating membrane longitudinally in the container body so as to define spaces within the container body communicating with the nozzle means,
isolating the two jellied components of the two-part composition contained respectively in said spaces and separately preserving the two components being without being mixed together in the container body by the isolating membrane therebetween,
removing the isolating membrane from the container body,
fitting an urging lid slidably in a bottom of the container body at an end remote from said leading end for sliding movement of the urging lid along an inner wall of the container body,
extruding said two components into the mixing nozzle by sliding the urging lid into the container body and pushing the two components out of said spaces into said mixing nozzle, and mixing the two components when the latter are pushed out of said spaces into said mixing nozzle by the sliding of said urging lid.

6. The method according to claim 5, wherein
the jellied components are jellied with a viscosity modifier.

7. A method according to claim 6, wherein
said viscosity modifier is selected from the group consisting of benzylidenesorbitol, lauroylglutamic dibutylamide, organobentonites, asbestos powders, silica powders and hydrogenated caster oils.

* * * * *